June 6, 1939.　　　　F. HARVEY　　　　2,161,571
BUS BAR CONDUIT SYSTEM
Filed Oct. 3, 1936　　　4 Sheets-Sheet 1
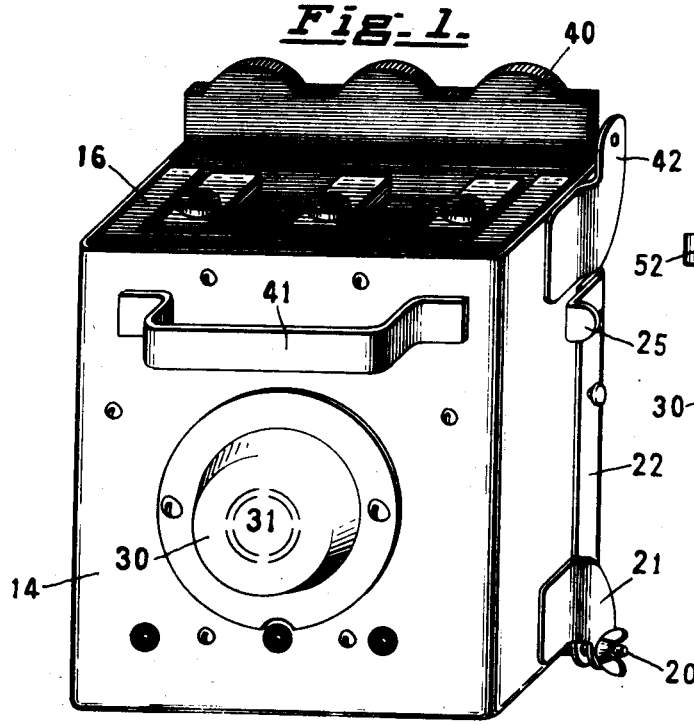
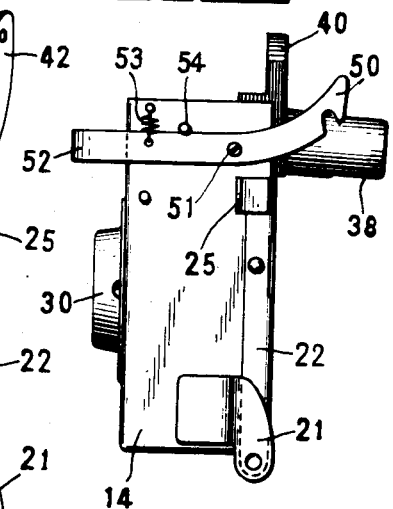
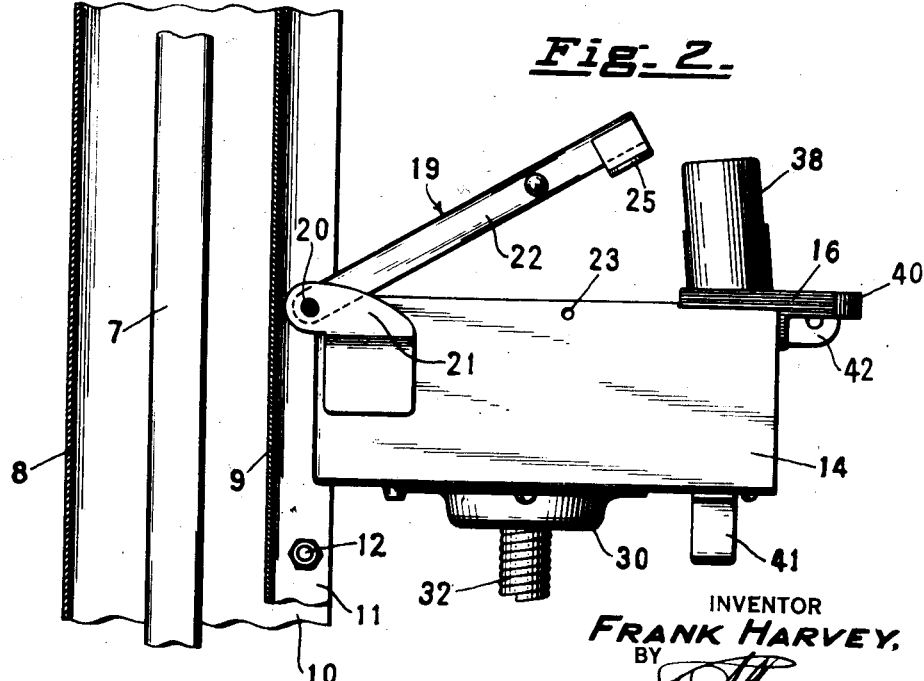
INVENTOR
FRANK HARVEY,
BY
ATTORNEY June 6, 1939.  F. HARVEY  2,161,571
BUS BAR CONDUIT SYSTEM
Filed Oct. 3, 1936  4 Sheets-Sheet 2
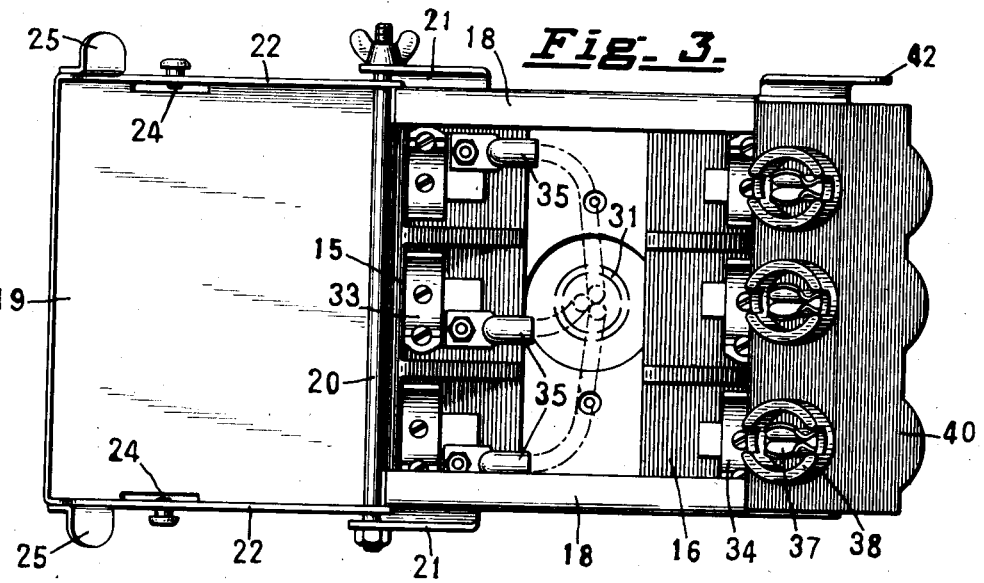
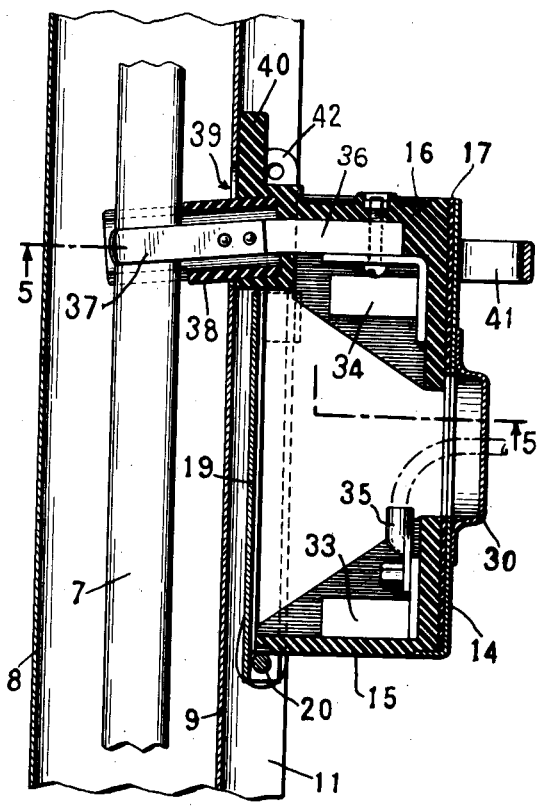
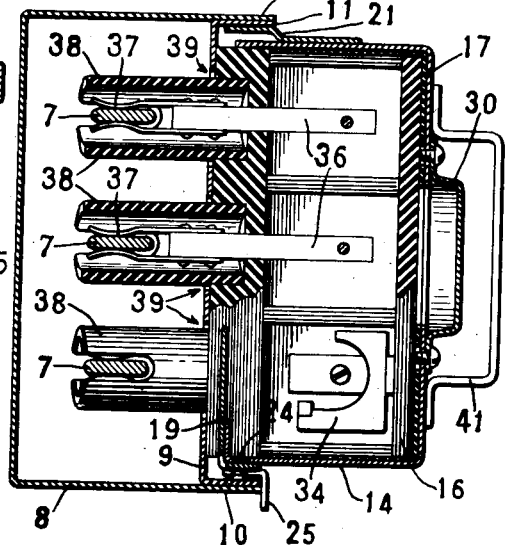
INVENTOR
FRANK HARVEY,
BY
ATTORNEY

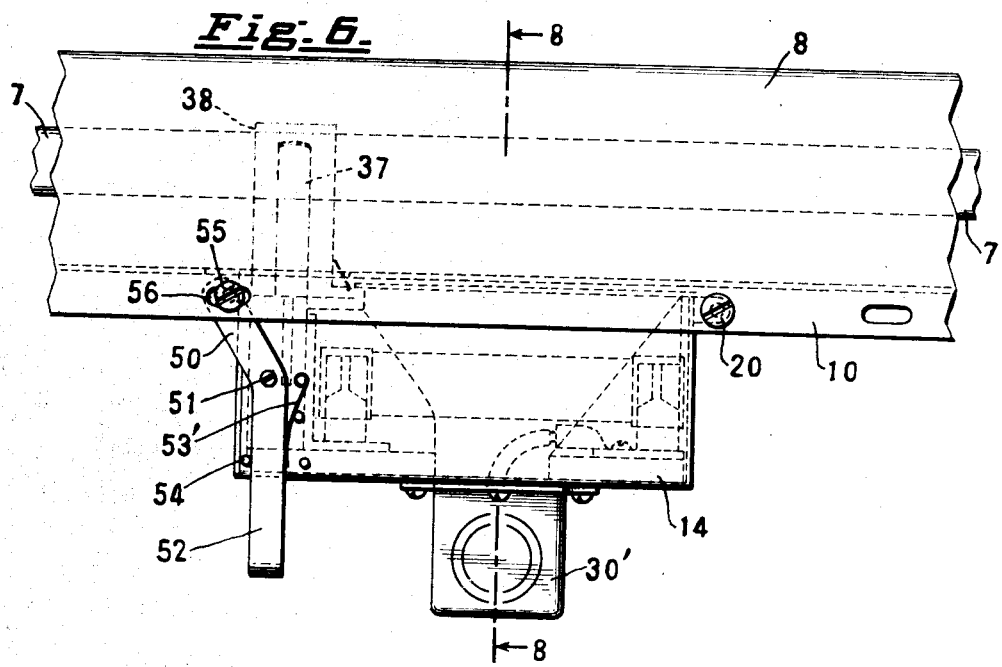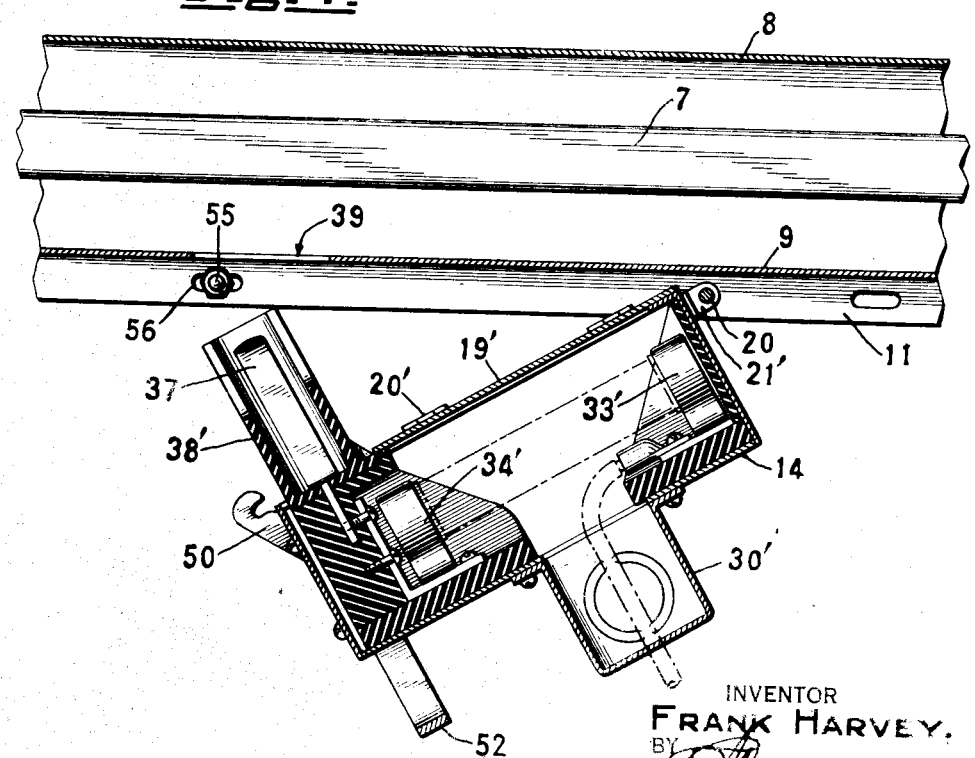

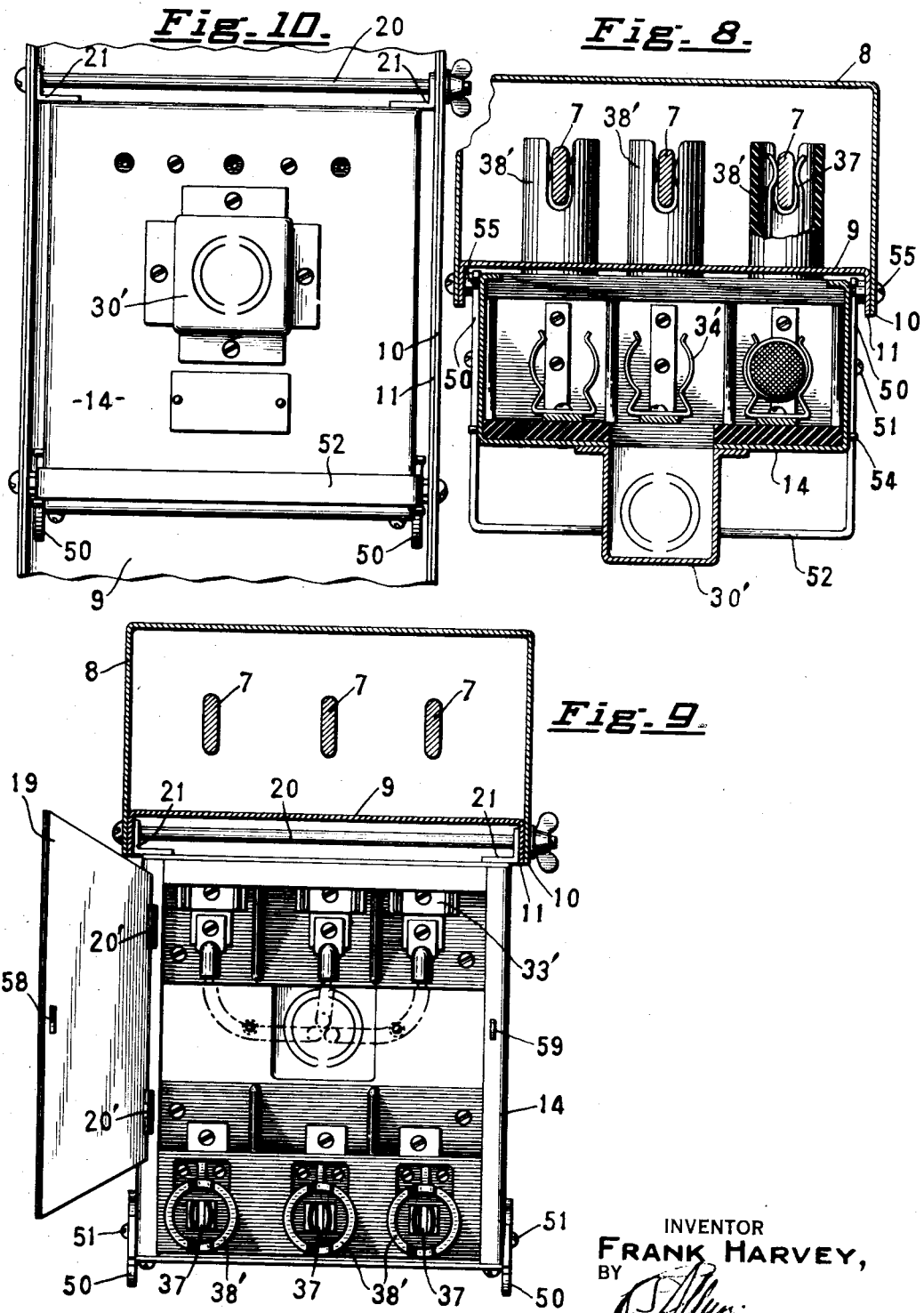

Patented June 6, 1939

2,161,571

UNITED STATES PATENT OFFICE 2,161,571

BUS BAR CONDUIT SYSTEM

Frank Harvey, Cincinnati, Ohio, assignor to The Trumbull Electric Manufacturing Company, Plainville, Conn., a corporation of Connecticut Application October 3, 1936, Serial No. 103,815

8 Claims. (Cl. 200—114)

My invention relates to an electrical distribution system and a connection unit for taking off power for branch circuits. In the main system, bus bars are used to carry the current and these bars are mounted within a housing or conduit. The main part of the present invention relates to a branch take-off unit and its connection to the bus bar conduit.

One object of the invention is to make an extremely simplified take-off unit for the system.

Another object is to provide fuses in the unit so positioned and guarded that it is impossible to re-fuse the unit without first electrically disconnecting the take-off unit from the bus bars.

Still another object is to strengthen the construction of units for the above purpose and insure the proper positioning of the parts in respect to the bus bar conduit.

Another object is to generally increase the safety factor in devices of this type, making it almost impossible for anyone to receive an electric shock through mismanagement or misuse of the device.

It is also intended to so fashion the device that undue mechanical strain on the take-off unit will cause the same to become electrically disengaged, although in the ordinary use of the unit the electrical connection will be under control of a worker or operator.

These and other objects and advantages are obtained by constructing the conduit for the bus bars with a pair of flanges extending at right angles from one side (usually the bottom) thereof. The bus bars are arranged side by side in the conduit in three planes substantially parallel to the planes of the flanges. Between the flanges of the conduit, the take-off unit is hinged, held in place by removable means which also act as the pivot for a cover for the unit. This cover has a snap engagement with the unit and conceals the fuses which are inside of the unit. The snap-engagement means may also act as a positioning means for the unit, insuring that the unit be properly aligned with the conduit flanges.

The cover of the unit also carries means to insure that it be closed when the unit is swung into position on the conduit. Of course, as is usual in devices of this general character, the unit carries contact blades for engagement with the bus bars, the contacts being electrically connected to one end of the fuses in the unit. The other ends of the fuses are of course connected electrically to terminals for the taking off of branch connections. The unit also carries means for supporting a branch conduit. When the unit is swung toward the bus bar conduit the contacts engage the bus bars and power may be taken off at the branch conduit.

Fig. 1 is a perspective view of a connector forming a part of an installation involving my invention.

Fig. 1a is a side view showing a modification.

Fig. 2 is a side view and partial section showing the connector unit associated with the housing or conduit for the bus bars, the connector being shown in the open circuit position with the cover of the fuse chamber partially opened.

Fig. 3 is a view showing the inside of the connector with the cover open.

Fig. 4 is a longitudinal sectional view of the bus bar conduit with the connector in the closed circuit or ON position.

Fig. 5 is a transverse sectional view on the plane of the line 5—5 of Fig. 4.

Fig. 6 is a side view of a fragment of a bus bar conduit with a modified form of connector shown in the closed circuit position.

Fig. 7 is a side view and section of the form of Fig. 6 but with the connector in the open circuit position.

Fig. 8 is a cross sectional view of the same form on the plane of the line 8—8 of Fig. 6 but showing the connector in the closed circuit position.

Fig. 9 is a cross sectional view of the bus bar conduit and shows the connector of Figs. 6, 7, and 8 in an open circuit position and with the door to the fuse compartment open.

Fig. 10 is a view of the form shown in Fig. 6 taken looking upwardly with respect to Fig. 6.

The bus bars 7 are supported in any suitable manner in the housing or conduit which in the form shown consists of a U-shaped body portion 8 and a cover 9. These two parts of the conduit are connected together by overlapping flanges 10 and 11 which are secured together at intervals for instance by bolts 12. The flanges 10 and 11 preferably extend in planes parallel with the bus bars.

The connector or plug-in device for branch circuit connection is in a box-like form and is hinged to the flanges 10 and 11. The body of the connector has a U-shaped metal shell 14, the ends of which are closed by insulating members 15 and 16. This shell is also preferably lined with an insulating fibre sheet 17. The edges 18 of the shell are turned inwardly or flanged to reenforce the shell and afford a seat for the door 19. The body or shell of the box and the door are both hinged on a shaft 20 which extends transversely of the housing and is supported in the flanges 10 and 11. The shell is preferably provided with hinge plates 21 which fit between the flanges 11 and the door 19 has side flanges 22 which fit over the edges of the shell 14 when the door is closed and inside of the outer ends of the hinge plates 21.

The sides of the sell are provided with recesses 23 adapted to be engaged by studs 24 which project inwardly from the flanges 22 of the door. The sides of the shell being somewhat resilient, the door is frictionally held to the shell when the door is closed. The door may be provided with one or more thumb pieces or handles 25 to facilitate opening the door.

This apparatus is particularly intended for use where flexible electrical cables are employed for the branch connections. Consequently the connector box 14 is provided with an anchorage member 30 in the form of a boss connected to the metal shell of the box.

This boss is provided preferably with a suitable knock-out 31 to facilitate connection of a flexible cable 32 in some suitable manner. Inside the box are located clips 33 and 34 adapted to receive the circuit protective fuses or other devices. The branch circuit wires are connected to terminals 35 which are mounted in the insulating piece 15 which also carries the fuse clips 33. The other insulating piece 16 supports terminals 36 and the associated fuse clips 34. To each terminal 36 is secured a suitable contact member 37 for engaging a bus bar within the conduit. Each contact preferably consists of two spring members adapted to frictionally engage the opposite sides of a bus bar so as to securely hold the parts in the closed circuit position. The contact jaws 37 are preferably inclined somewhat as shown in Fig. 4.

Each contact is protected or guarded by a tubular insulating member 38, one end of which is seated in the insulating member 16 and the other end of which is slotted to clear the bus bar. The cover plate 9 of the housing or conduit is provided with an opening 39 for each contact and its insulating guard. The insulating block 16 is preferably provided with an extension 40 to overlap the edge of the openings 39.

The connector is also preferably provided with a handle 41 by means of which it may be swung about the hinge 20 to open or close the circuit. An extension 42 from one side of the connector box may be provided to coact with one of the flanges on the conduit to facilitate sealing the box in the closed circuit position.

It will be seen from the foregoing that the electrical parts are all safely housed so that it is practically impossible for anyone to receive a shock through careless handling. The bus bar conduit is of the simplest character and as the swinging connector box is hinged to the flanges of the conduit the contacts must necessarily swing in a plane parallel with the bus bars so as to insure effective electrical connection. By the construction set forth it will be seen that an extraordinary pull on the cable will automatically open the circuit so as to avoid accident.

It will also be seen that it is impossible to get at a circuit protecting fuse without first opening the circuit.

Even when the branch box is in the open circuit position access to the fuses is prevented by the door 19. It will also be noted that the door is so associated with the box that it will be closed automatically whenever the connector is moved from the open circuit to the closed circuit position.

In the form shown in Fig. 1a the connector box is provided with latch members 50 which are hinged at 51 to the opposite sides of the shell, which latch members are adapted to automatically engage projections (not shown) on the side walls of the bus bar conduit. These latch members are preferably connected by a handle member 52 which projects beyond the outer surface of the box and takes the place of the handle 41 previously described. A spring 53 serves to hold the handle and the attached latch members in the latching position. Stops 54 limit the movement of the latch members.

In the form shown in Figs. 6 to 10 the bus bar conduit and the main parts of the connector are similar to those shown in the other figures with a few distinctions. The lugs or ears 21' are connected to the shell 14 and are hinged on the cross shaft 20. The latch member 50 is similar to that shown in Fig. 1a and engages the stud 55 to hold the connector in the closed circuit position. The stud 55 is mounted in a slot 56 in a flange of the conduit so as to permit some adjustment to bring the stud into the best position to be engaged by the latch member.

The sleeve 38' which surrounds the contact jaws 37 projects at right angles to the main part of the connector.

The boss or anchorage 30' for the cable connection is provided with a number of surfaces with knockouts so that the cable may be connected to the most convenient side. The fuse clips 33' and 34' are of conventional form.

In this form the door 19' is hinged at 20' along one edge of the connector casing or shell. It is therefore necessary to close the door before trying to close the circuit, that is, the door will not close automatically when the circuit is closed as is the case with the preferred form. This door 19' may have an opening 58 to receive a latch 59 carried by the shell for holding the door closed.

Other changes may be made without departing from the spirit or scope of my invention.

I claim:

1. In a bus bar power distribution system, a conduit for the bus bars having openings beneath the bus bars, a branch box hinged at one end to the conduit and having branch connector blades projecting from the other end and adapted to be thrust through said openings and to engage the bus bars in the conduit, said branch box having a fuse compartment with an opening only in the face of the box between the hinged end and the connector blades for access to the interior when the connector blades are withdrawn from the bus bars, and a door hinged to said box for closing said opening in said branch box, the door being held fully closed by the box when the blades fully engage the bus bars and the construction of the box and door being such that it is necessary to disengage the blades from the bus bars and open the door of the box in order to obtain access to the fuse compartment.

2. A bus bar conduit formed of a main channel portion and a channel cover portion having overlapping side flanges, a protector-box connector hinged to said flanges and having contact jaws insertable through said cover portion and a door for the box hinged to said flanges and interposed between the connector and the conduit.

3. In a bus bar distribution system, a conduit having openings leading to the bus bars and side flanges, a connector box hinged to the side flanges and having means for connecting a branch cable to the outer face of the box, contact jaws projecting from the box for insertion into the openings to engage the bus bars in the conduit and insulating flanges projecting from one end of the box for overlapping edges of the openings.

4. A bus bar conduit connector having a shell with insulating pieces mounted in the shell and forming the ends of the connector, fuse clips mounted in said insulating pieces, plug-in contacts carried by one of the insulating pieces, said latter piece having a flange projecting therefrom to overlap openings in the conduit when the contacts are inserted.

5. A bus bar conduit connector having a metal shell with inturned flanges along its edges, insulating blocks secured in the ends of the shell and forming the ends of the connector, hinge lugs projecting from one end of the shell for attachment to side flanges of a conduit, contact jaws carried by the insulating block in the opposite end of the shell, a cable connection at the outer face of the shell between the ends thereof and fuse clips carried by the insulating blocks within the shell.

6. A bus bar conduit connector having a shell with hinge lugs at one end for mounting the connector on side flanges of a conduit and a door for closing the connector hinged to said lugs and provided with means for engaging the edges of the shell.

7. A bus bar conduit connector having a shell with inturned side flanges, insulating blocks secured in the ends of the shell and forming the ends of the connector, fuse clips secured to the insulating blocks, a cable connector secured to the shell, a door hinged to the shell and engaging the flanges when closed and plug-in contact jaws carried by one of the insulating blocks for insertion into a bus bar conduit.

8. In a bus bar distribution system, a conduit substantially rectangular in cross section having an opening in one side leading to a bus bar in the conduit, flanges on the conduit forming a channel face on the side having the opening, a box-like branch circuit connector of a depth greater than said channel and fitting between said flanges, hinge means passing through said flanges and pivotally supporting one end of the connector between said flanges, a contact element projecting from the other end of the connector for insertion into the opening to electrically connect a bus bar in the conduit to a branch circuit, releasable means for supporting this other end of the connector between said flanges, and a branch circuit conductor support on a face of said connector opposite said contact element and outside of said channel.

FRANK HARVEY.